United States Patent [19]
Curry et al.

[11] Patent Number: 5,664,165
[45] Date of Patent: Sep. 2, 1997

[54] GENERATION OF A SYNTHETIC CLOCK SIGNAL IN SYNCHRONISM WITH A HIGH FREQUENCY CLOCK SIGNAL AND CORRESPONDING TO A LOW FREQUENCY CLOCK SIGNAL

[75] Inventors: Sean Eugene Curry, Pflugerville; Barry Joe Wolford, Austin, both of Tex.

[73] Assignee: International Business Machines Corporation, Armonk, N.Y.

[21] Appl. No.: 424,837

[22] Filed: Apr. 19, 1995

[51] Int. Cl.$^6$ .................................................. G06F 1/08
[52] U.S. Cl. ............................................................. 395/556
[58] Field of Search ................................... 395/550, 556, 395/555

[56] References Cited

U.S. PATENT DOCUMENTS

| | | |
|---|---|---|
| 3,675,131 | 7/1972 | Pickholtz . |
| 4,282,493 | 8/1981 | Moreau . |
| 4,380,743 | 4/1983 | Underhill et al. . |
| 4,476,527 | 10/1984 | Clayton, IV ................. 364/DIG. 1 |
| 4,750,111 | 6/1988 | Crosby, Jr. et al. ........... 364/DIG. 1 |
| 4,845,437 | 7/1989 | Mansur et al. . |
| 4,887,051 | 12/1989 | McCutcheon . |
| 4,969,163 | 11/1990 | Ungerboeck . |
| 5,034,967 | 7/1991 | Cox et al. . |
| 5,179,438 | 1/1993 | Morimoto . |
| 5,191,657 | 3/1993 | Ludwig et al. . |
| 5,237,567 | 8/1993 | Nay et al. . |
| 5,237,670 | 8/1993 | Wakerly . |
| 5,243,334 | 9/1993 | Georgiou et al. . |
| 5,305,452 | 4/1994 | Khan et al. ..................... 395/550 |
| 5,313,594 | 5/1994 | Wakerly ..................... 364/DIG. 1 |
| 5,325,516 | 6/1994 | Blomgren et al. ............. 395/550 |
| 5,329,553 | 7/1994 | Abbiate et al. . |
| 5,369,748 | 11/1994 | McFarland et al. ........ 364/DIG. 1 |
| 5,371,880 | 12/1994 | Bhattacharya ................. 395/550 |
| 5,376,894 | 12/1994 | Petranovich . |
| 5,381,543 | 1/1995 | Blomgren et al. ............. 395/550 |
| 5,392,409 | 2/1995 | Umeno et al. ............. 364/DIG. 1 |

*Primary Examiner*—Thomas M. Heckler
*Attorney, Agent, or Firm*—Casimer K. Salys

[57] ABSTRACT

A system and method for generating a synthetic clock signal in synchronism with both a high frequency clock signal and low frequency clock signal, where the rising and falling edges of the low frequency clock signal are subject to material skew. The frequency ratio between the high and low frequency clock signals is derived by sampling the low frequency clock signal at the frequency of the high frequency cloak signal. The synthesized low frequency clock signal is generated directly from the high frequency clock signal using the determined relative frequency ratio. The synthetic clock signal is also in synchronism with the low frequency clock signal. Since the synthetic clock signal is derived directly from the high frequency clock signal, it is not subject to the skew problems of the low frequency clock signal.

16 Claims, 8 Drawing Sheets

| SAMPLING | RESULTS FOLLOWING AT LEAST 4 CPU CLK CYCLES | | | | | | | | |
|---|---|---|---|---|---|---|---|---|---|
| SAMPLE | ↓ | ↓ | ↓ | ↓ | ↓ | ↓ | ↓ | ↓ | ... |
| RIGHT SHIFTED PCI CLK AT ÷ 1 | 0 | 0 | 0 | 0 | 0 | 0 | 0 | 0 | ... |
| LEFT SHIFTED PCI CLK AT ÷ 1 | 1 | 1 | 1 | 1 | 1 | 1 | 1 | 1 | ... |
| RIGHT SHIFTED PCI CLK AT ÷ 2 | 0 | 1 | 0 | 1 | 0 | 1 | 0 | 1 | ... |
| LEFT SHIFTED PCI CLK AT ÷ 2 | 1 | 0 | 1 | 0 | 1 | 0 | 1 | 0 | ... |
| RIGHT SHIFTED PCI CLK AT ÷ 3 | 0 | 1 | 0 | 0 | 1 | 0 | 0 | 1 | ... |
| LEFT SHIFTED PCI CLK AT ÷ 3 | 1 | 1 | 0 | 1 | 1 | 0 | 1 | 1 | ... |

GENERATION OF A SYNTHETIC CLOCK SIGNAL IN SYNCHRONISM WITH A HIGH FREQUENCY CLOCK SIGNAL AND CORRESPONDING TO A LOW FREQUENCY CLOCK SIGNAL

BACKGROUND OF THE INVENTION

The present invention relates generally to clocked digital data processing systems. More particularly, the invention is directed to the generation of synchronized clock signals in data processing systems having multiple clock signals of different frequency.

The designs of computers and workstations continue to evolve at a rapid pace as new processors, interchangeably referred to herein as microprocessors or CPUs, become available and are integrated with input/output resources into more advanced versions of personal computers and workstations. The prevailing and evolutionary changes with computer models tend to be associated with the clock rates of the processors. Namely, it is very common for a fundamental design to be upgraded through the use of faster processors in half year or less increments of a model's life cycle. This has created a need for a versatile interface/bridge system, one which efficiently mates relatively low clock frequency input/output busses with high clock frequency processor busses, which processor busses are subject to evolutionary changes.

The presence of multiple busses operating at different frequencies within a common data processing system introduces a need for interface synchronization, so that clocked events on one bus, for example, the I/O bus, are synchronized to clocked events occurring on the processor bus. The clock signal synchronization problem is experienced by any circuit device which interacts at one time or another with both busses.

The synchronization becomes particularly relevant when one recognizes that the tolerances for the multiple clock signals may be materially different. For example, advanced computer designs will often operate the processor bus at a clock rate two or three times that of the I/O bus, while providing an I/O bus clock signal tolerance, in terms of the signal rise and fall skews, significantly larger than that allowed the processor clock. In part, this is attributable to the longer duration of the lower frequency I/O clock signals. Unfortunately, the extended skew tolerances exacerbate synchronization problems for devices operating with reference to both busses.

The synchronization problem becomes particularly acute when the interface/bridge device is an integrated circuit chip which receives the two clock signals as inputs and must derive from those two clock signals an internal clock suitable to synchronize with both busses. The prevailing design approach is to manage the clock signal tolerances internal to the integrated circuit by judiciously latching incoming signals. Unfortunately, that design approach becomes less viable as the frequencies increase, and lacks the flexibility needed with evolving designs in which the ratio of clock frequencies change.

What is needed is a design, and in particular an integrated circuit design, which can automatically determine the relative frequencies between harmonicly related clock signals, and based upon that determination select and generate a synthetic clock signal presenting an accurate synchronization of one of the clock signals to the selected other clock signal.

SUMMARY OF THE INVENTION

The problems characterizing the prior art are solved in a data processing system with multiple clock signals, where the first and the second clock signals may differ in frequency, through an apparatus for generating a synthetic clock signal, the apparatus comprising a means for determining the relative frequency of the second clock signal based upon the frequency of the first signal, a means for selecting a frequency rate for the synthetic clock signal responsive to the determined relative frequency, and a means for generating the synthetic clock signal at the frequency of the second clock signal in direct synchronism with the first clock signal. In another form, the invention relates to the process performed by the aforementioned apparatus.

In one form of its structure and practice, the invention includes a mechanism for automatically determining the relative frequency between a high frequency processor bus and a low frequency input/output (I/O) bus. The frequency ratio is then used to synthesize the I/O bus clock signal in synchronism with the processor bus clock signal. The invention is particularly valuable for bus bridge devices which receive both processor bus and I/O bus clock signals and use such signals to synchronize data or control signal transfers between the busses. Often, the bus bridge device is an integrated circuit which must manage an I/O bus clock signal input having significant potential waveform skew as a consequence of less restrictive tolerance standards than those specified for the higher frequency processor bus clock signals.

In a particularized practice of the invention, the lower frequency I/O bus clock signals are sampled at the higher frequency processor bus clock rate, decoded, and based upon that decode used to select a relative clock frequency ratio for the synthesization of the I/O bus clock signal. Once the clock frequency ratio is determined, a synthetic I/O bus clock signal is generated based upon the processor clock signal while remaining in synchronism with the original, and somewhat imprecise, I/O bus clock signal.

These and other features of the invention will be more clearly understood and appreciated upon considering the detailed embodiment set forth hereinafter.

DESCRIPTION OF THE PREFERRED EMBODIMENT

Figure 1:
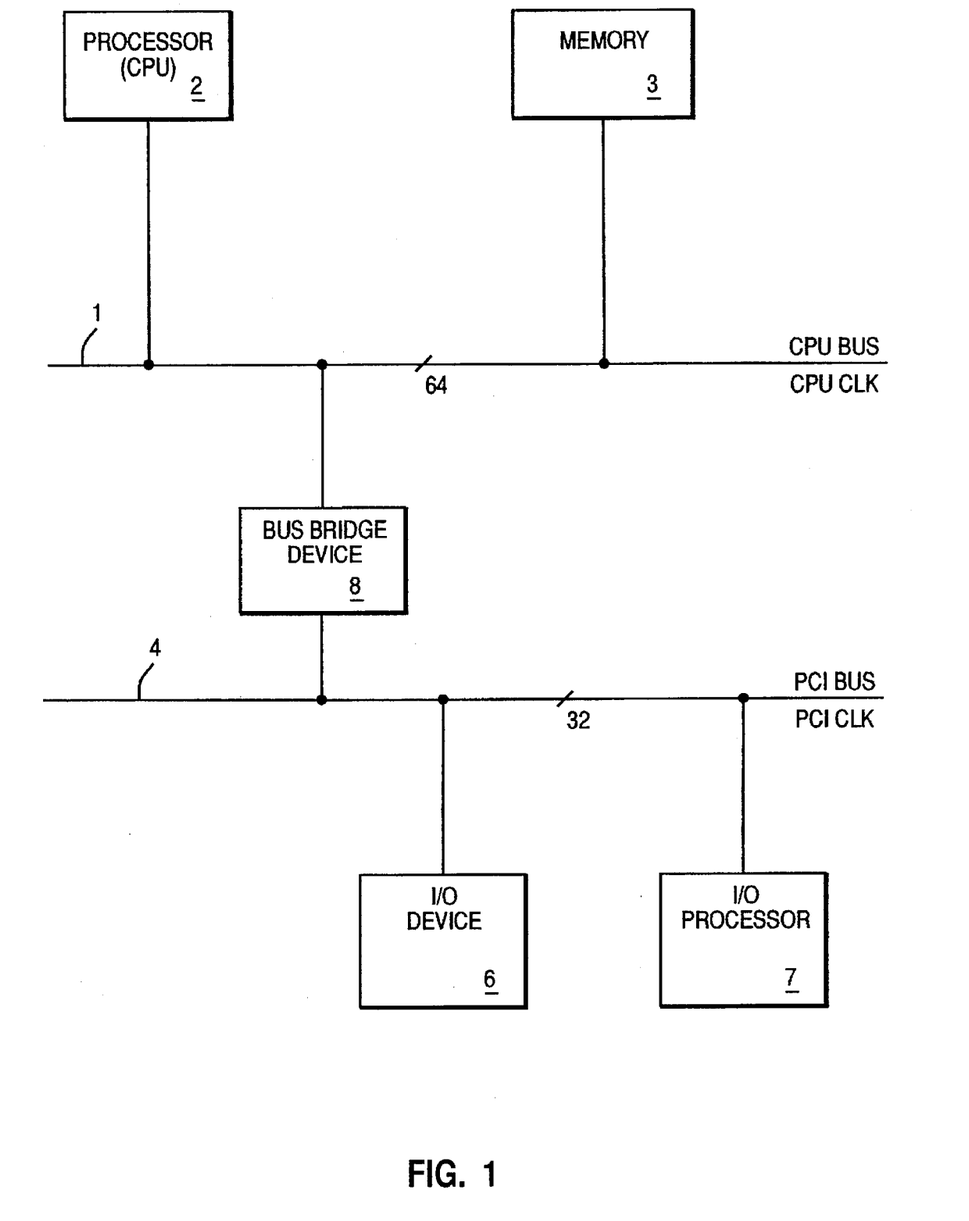
FIG. 1 is a schematic block diagram of a personal computer or workstation type data processing system.

FIG. 1 schematically depicts the context within which the invention is preferably practiced. The architecture illustrated is typical of a contemporary personal computer or workstation type digital data processing system having multiple busses of different clock frequency and bus width. As shown in FIG. 1, the 64 bit wide processor (CPU) bus 1 has connected thereto one, or more processors 2 and main memory system 3. Preferably, processor 2 is a PowerPC (TM) microprocessor of the architecture commercially available from IBM Corporation. Memory system 3 is typically dynamic RAM (DRAM), and is likely to include as a part of the memory architecture one or more levels of cache. Not shown, but often present, are memory control devices, such as conventional DMAs for direct memory access.

In keeping with the aforementioned conventional design philosophy, FIG. 1 shows the presence of an input/output (I/O) bus 4, which for purposes of the embodiment conforms to the peripheral component interface (PCI) bus standard. The PCI bus standard is characterized by a bus width of 32 lines and a maximum clock frequency of 33 MHz. In contrast to the PCI bus standard maximum 33 MHz, contemporary systems use processor with clock rates up to 100 MHz.

PCI bus 4 typically has connected thereto a variety of I/O devices 6 as well as intelligent I/O processor managed systems 7. The intelligent I/O devices can act as bus masters on PCI bus 4, and can also provide the interface to further levels of I/O busses, such as the MicroChannel (TM) bus as defined by IBM Corporation, or the industry standard EISA bus design.

The present invention is directed to functions performed within bus bridge device 8, a device which interfaces high frequency 64 bit wide CPU bus 1 to low frequency 32 bit wide PCI bus 4. One example of such device is described in the document entitled "The IBM27-82650 PowerPC to PCI Bridge User's Manual", published in July, 1994, and commercially available from IBM under order No. MPR650UMU-01. In particular, the invention is directed to the generation of a synthetic clock signal suitable to synchronize transfers of data and control signals between busses when the busses operate at different clock frequencies and related different clock signal tolerances.

Figure 2:
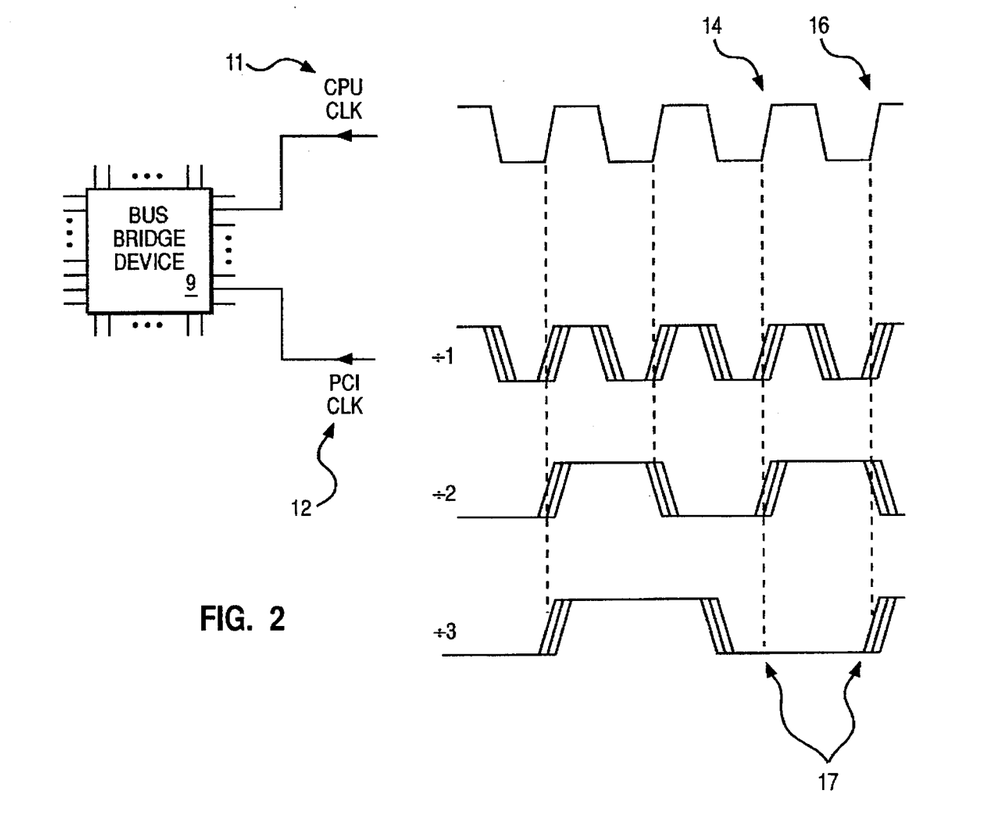
FIG. 2 schematically depicts processor and I/O clock signals provided to an integrated circuit chip bridge device.

FIG. 2 depicts a representative bus bridge device 9 in a typical integrated circuit format receiving as inputs through selected pins a CPU clock signal, generally at 11, and a PCI bus clock signal, generally a 12. Note that the corresponding clock signal waveforms are depicted at the right, wherein the processor and PCI clock signals may differ in frequency anywhere from a 1:1 ratio to a 3:1 ratio. Also depicted is the fact that the PCI specification permits the PCI clock signal rising and falling edges to exhibit a significant skew. For example for a 33 MHz clock the PCI standard allows the edges to range plus/minus 2 nanoseconds. This tolerance creates a significant synchronization problem for the bus bridge device which must latch data in synchronism with both clock signals.

Figure 3:
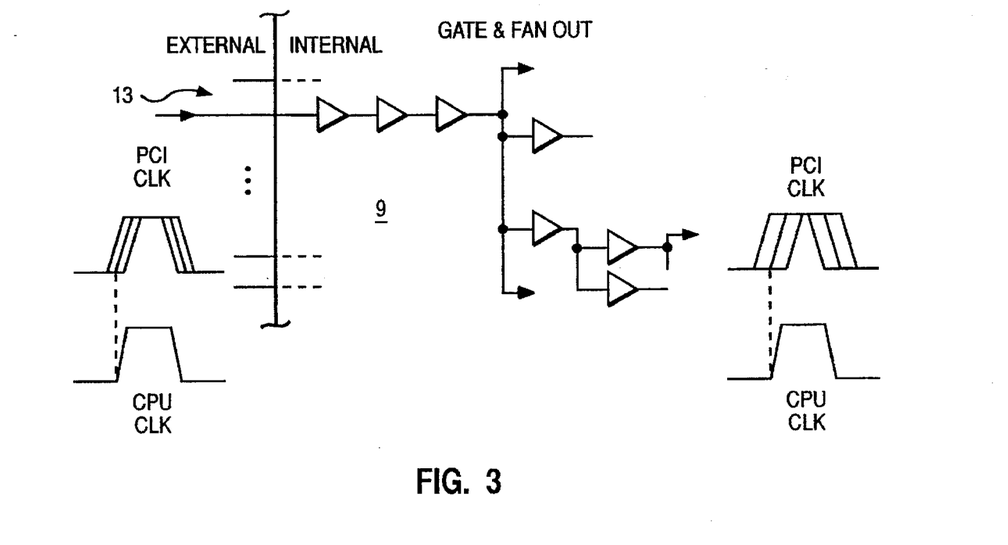
FIG. 3 schematically depicts the effects of fanout and gate delay tolerances within an integrated circuit chip as applies to clock signals.

FIG. 3 illustrates that the general problem described with reference to FIG. 2 becomes particularly difficult to manage as the clock signals permeate within the bus bridge device through multiple gates and fanout stages. For example, with a 1:1 PCI clock to CPU clock input signal at 13, gating and fanout tolerances within the chip effectively spread the PCI clock skew. Though shown exaggerated in FIG. 3, the effective growth in skew is a major problem since the PCI clock signal may at some stage interact with a relatively precise CPU clock signal. As the clock frequency ratio increases, the relative effect of the tolerance becomes more significant for purposes of synchronization.

One solution to the tolerance and skew characterizing the PCI clock signal is to synthesize a PCI clock signal from the relatively precise CPU clock signal using a divide circuit internal to the bus bridge device. Unfortunately, this requires that the bus bridge device be informed of the relative frequency ratio between the CPU clock signal and PCI clock signal. If three different clock frequency ratios are possible, such as in the example of FIG. 2, two integrated circuit pins must be allocated to the coding of information defining the relative clock frequencies. This is particularly undesirable in that integrated circuit pins are almost always in short supply, and have a direct impact on the relatively high cost of the integrated circuit package.

An alternate approach for entering information regarding the clock frequency ratio into the integrated circuit chip is through a bit serial code using only a single pin on the integrated circuit chip package. This would have to be accomplished during the boot stage of the data processing system power-up operation. Unfortunately, that means that the boot software must be made aware of the relative bus frequencies through a hard coding or an auto detect routine. Furthermore, the serial entry of relative frequency data during the boot process also precludes the availability of the PCI bus until the boot cycle is completed.

The generation of a synthetic PCI clock signal through a simple logic circuit combination of the CPU and PCI clock signals is particularly vulnerable to ambiguities when the frequency ratio is 3:1. This is shown at the right in FIG. 2, where a logical combination of the CPU and PCI clock signals at both CPU clock rising edges 14 and 16 could conclude a low PCI clock signal state, at 17, depending on the momentary skew of the PCI clock. Therefore, a direct logic circuit combination is not desirable, and especially so when the stretching effects of gate and fanout are taken into account as described with reference to FIG. 3, The fundamental problem and deficiencies characterizing other solutions are overcome in the present invention by using a two stage design. First, the frequency ratio of the bus signals is automatically determined within the confines of the integrated circuit chip based solely upon the CPU and PCI clock input signals. Secondly, and in reliance upon the drive frequency ratio, a synthetic PCI clock signal conforming to the detected frequency ratio is generated in direct synchronism with the CPU clock signal.

Figure 4:
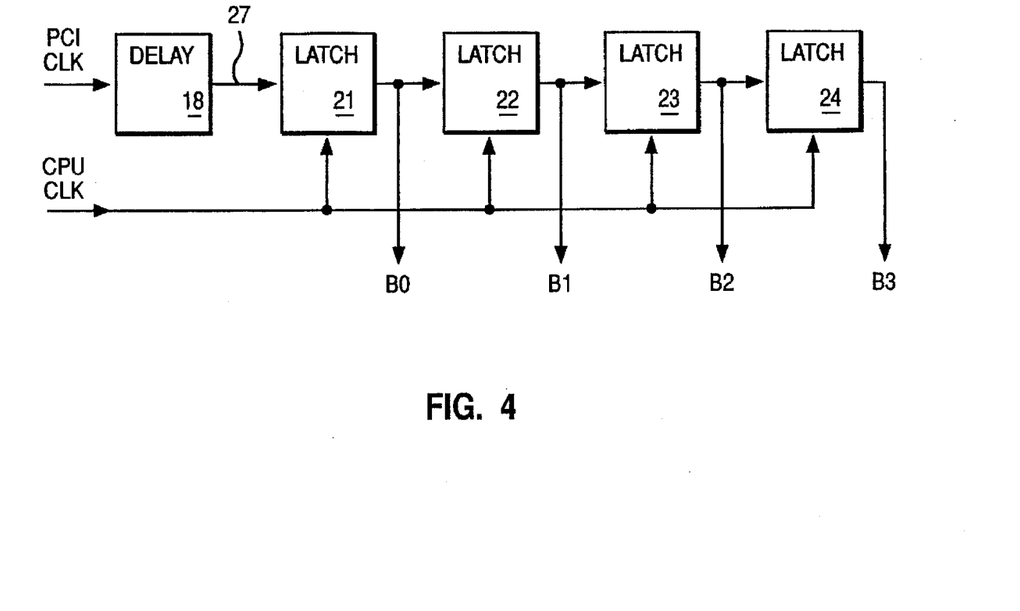
FIG. 4 schematically depicts by block diagram the sampling of a lower frequency clock signals.

The procedure begins with the functions performed by the blocks in FIG. 4. The incoming PCI clock signal is first delayed in block 18 to ensure that worst case latch set-up and hold constraints are satisfied with respect to the rising edges of the PCI and CPU clock signals. This is shown at 19 in FIG. 5, where all phase shifted PCI clock signals, whether right phase shifted or left phase shifted, are sufficiently misaligned with the rising edge of the CPU clock signal to ensure the latch set-up and hold constraints within the integrated circuit. The shifted/delayed CPI clock signal is thereafter sampled in latches 21, 22, 23 and 24 upon the leading edge of the CPU clock signal, as shown at 26 in FIG. 5. The sampled output from the latches appears as a binary vector composed of bits B0, B1, B2 and B3.

Figure 5:
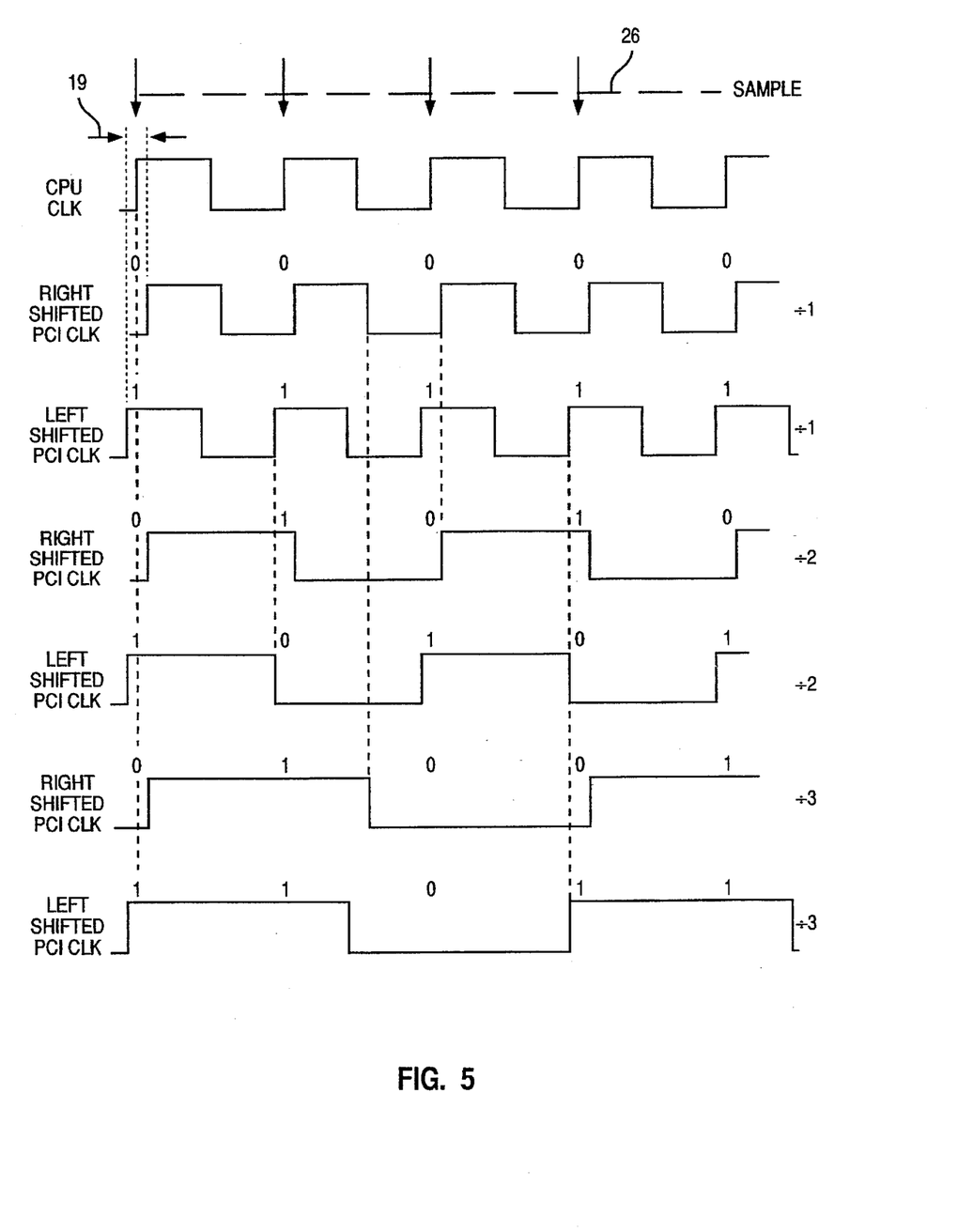
FIG. 5 schematically depicts by waveform the sampling operation as applied to various example clock signals.

In looking at FIG. 5, note that the binary vector changes depending on whether the PCI clock is right phase shifted or left phase shifted. As shown in the table of binary vectors set forth in FIG. 6, which correspond to the sampled values depicted in the waveforms of FIG. 5, note that the vector values also repeat after four CPU clock cycles. What is particularly relevant is that the patterns are quite distinct by frequency ratio.

Figure 6:
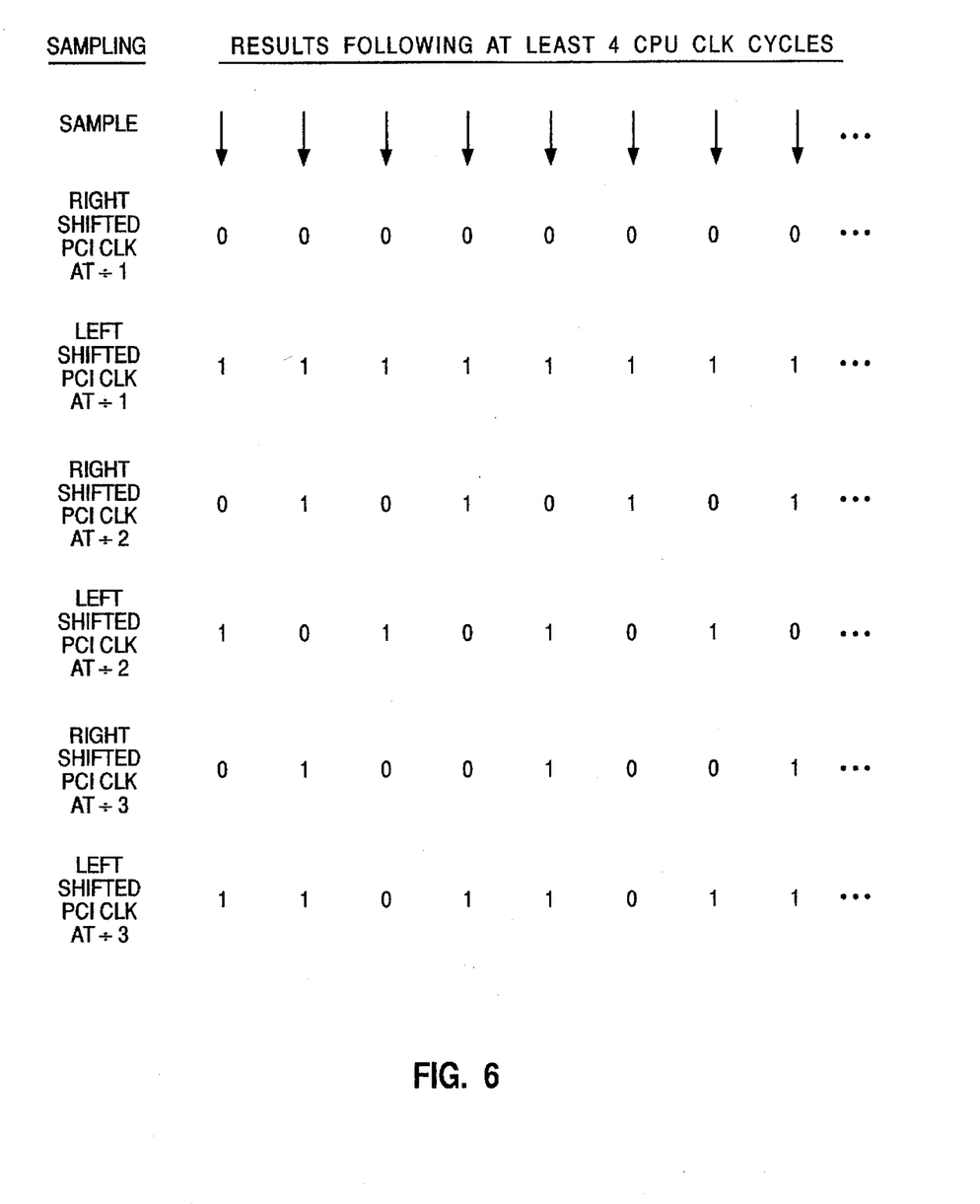
FIG. 6 sets forth a table of the binary vectors derived during the sampling illustrated with reference to FIG. 5.

Block 18 in FIG. 4 is a delay. Therefore, PCI clock signal 27 corresponds to the right shifted versions of the waveforms in FIG. 5 and bit vectors in FIG. 6. FIG. 6 shows that after four CPU clock cycles the B0-B3 binary vector of 0000 represents a 1:1 clock frequency ratio. On the other hand, the binary vector of 0101 represents a 2:1 clock frequency ratio. Lastly, the binary vector of 0100 represents a 3:1 clock frequency ratio.

Since delay 18 shifts the PCI bus clock signal sufficiently to avoid all skew effects, the vectors generated by the sampling are not susceptible to the timing errors which arise when the PCI bus clock signal is used directly with the CPU bus clock signal to generate a synthetic PCI bus clock signal internal to the integrated circuit chip.

Figure 7:
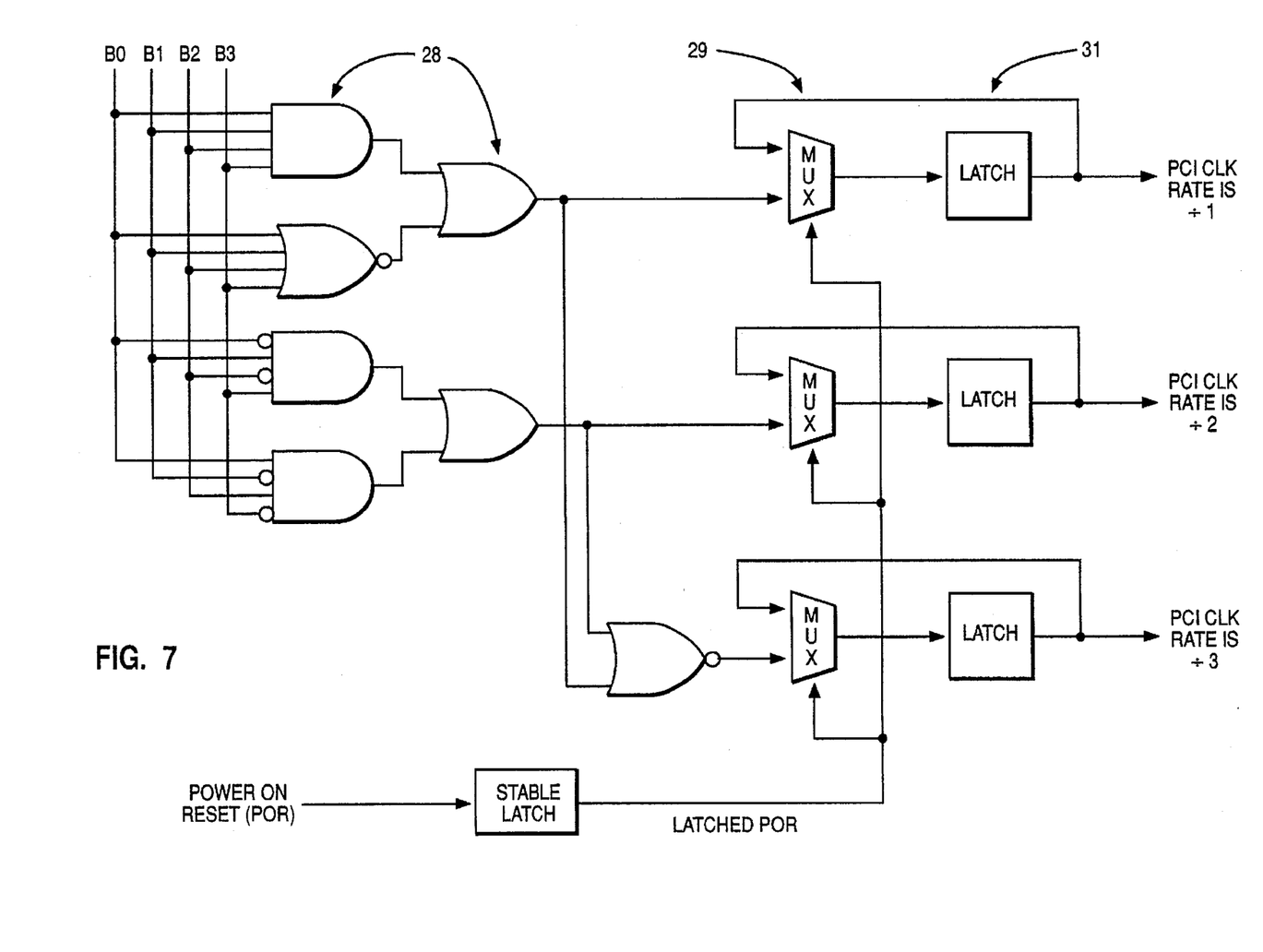
FIG. 7 depicts a circuit for decoding the sample vectors into a relative frequency ratio.

FIG. 7 depicts the decoding of the binary vector into signals which directly represent relative frequency ratios using the logic gates, generally at 28, a set of multiplexers, generally at 29, and a set of latches, generally at 31. The latches at 31 are used to hold the derived ratio at the conclusion of the power-on-reset (POR) operation associated with system initialization. Thereby, once the relative frequency ratio is determined it remains fixed for the duration of the system operation. Obviously it is possible to make this a dynamic derivation which is subject to change as the sampling and decoding progresses with successive CPU clock cycles. Note that the circuit in FIG. 7 derives the 3:1 clock frequency ratio by the absence of either a 1:1 or a 2:1 ratio signal.

Figure 8:
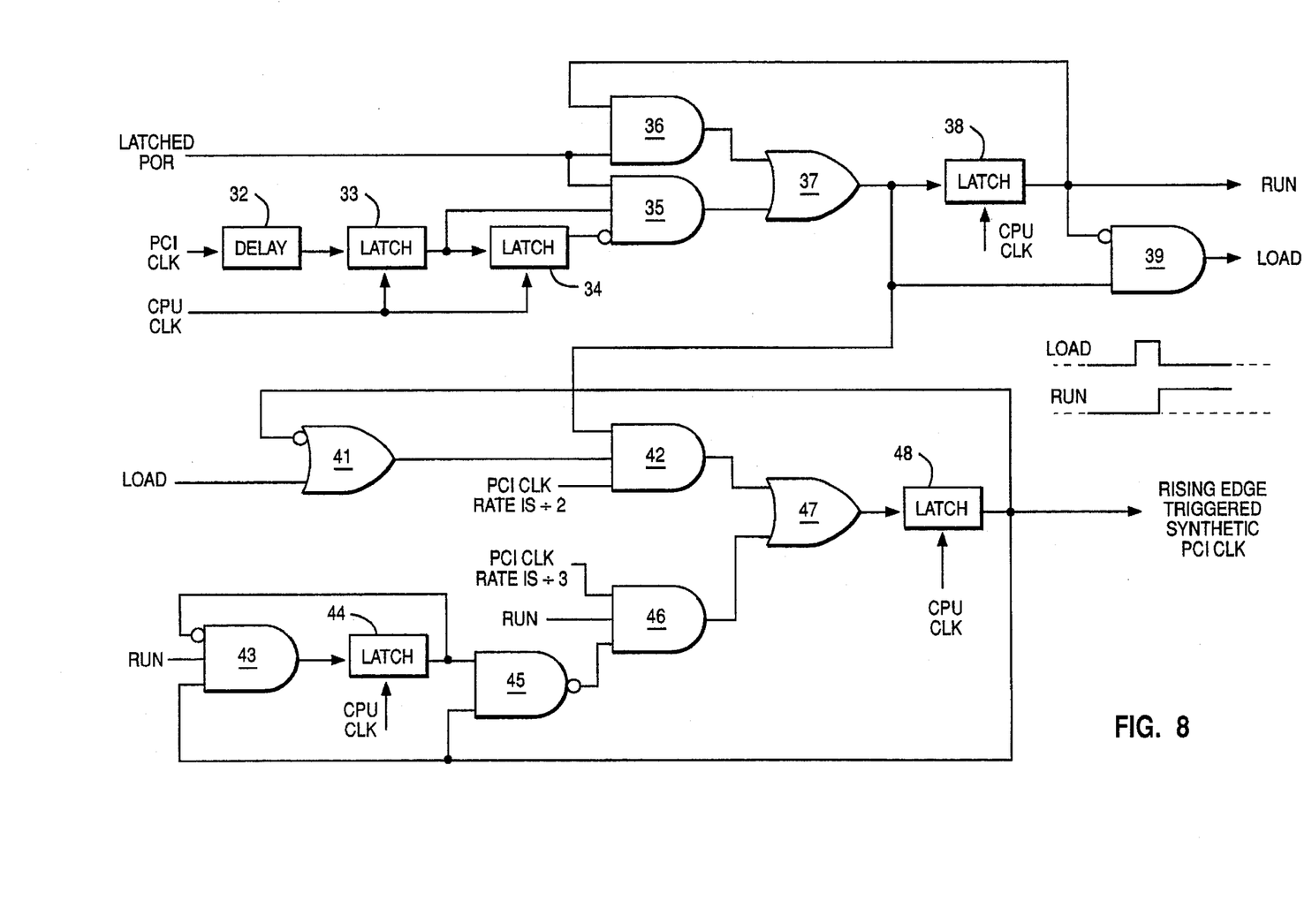
FIG. 8 schematically depicts a circuit for generating synthetic clock signals responsive to the processor clock signal and derived relative frequency ratio.

FIG. 8 schematically illustrates the circuitry needed to convert the clock frequency ratio information into synthetic PCI clock signals in direct synchronism with the CPU clock signal. Delay, latches, and logic gates 32-39 ensure that the start of the synthetic PCI clock signal matches the actual PCI clock signal, given that multiple leading edges of the CPU clock signal occur for each PCI clock signal when the clock frequency ratios are 2:1 or 3:1. Latches and logic blocks 41-48 combine the LOAD and RUN PCI clock synchronization signals with the outcomes of the automated frequency ratio determination signal in FIG. 7.

The final output is a rising edge defined synthetic PCI clock signal which is synchronized to the original PCI clock signal, at the frequency of the original PCI clock signal, lacks the skew problems of the original PCI clock signal, and is derived from and therefore synchronized to the CPU clock signal.

Figure 9:
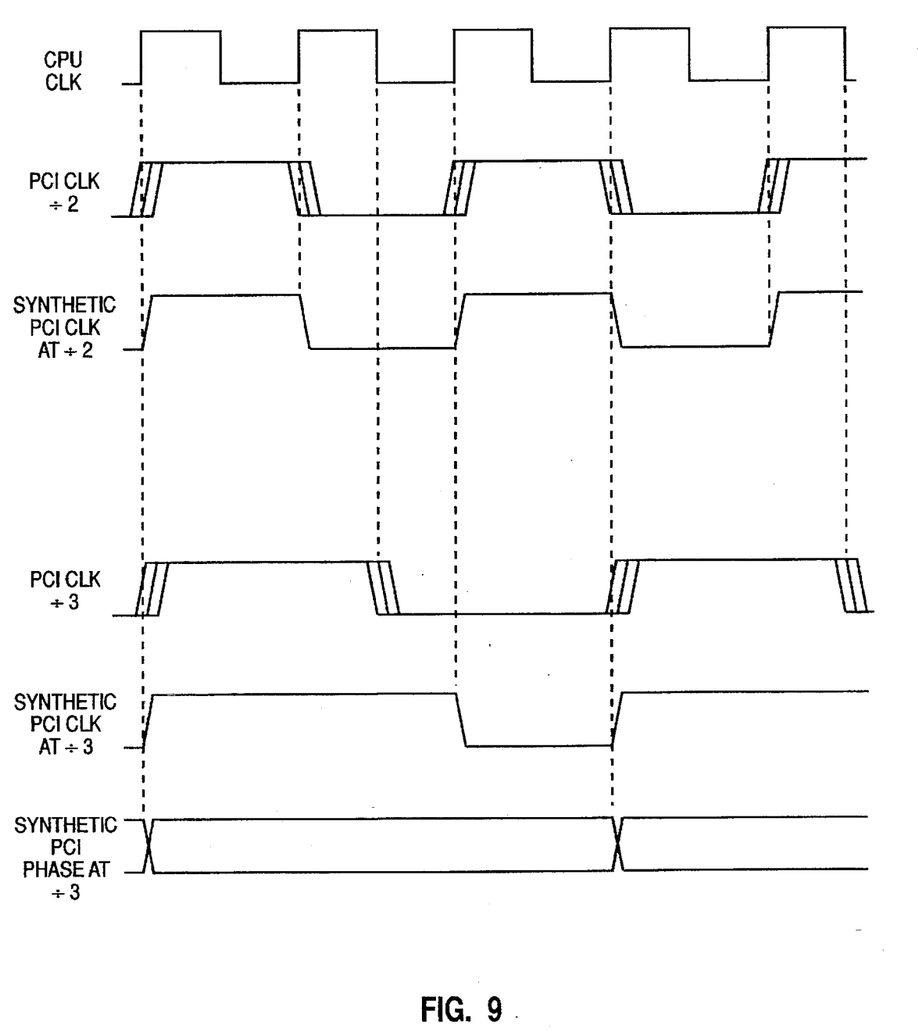
FIG. 9 schematically depicts waveforms of synthetic clock signals generated for two clock frequency ratios.

FIG. 9 compares and contrasts the shape of the synthetic PCI clock signal to the original PCI clock signal for CPU clock signal frequency ratios of 2:1 and 3:1. Note that the synthetic PCI clock signal for the 3:1 frequency ratio is asymmetric. However, since the clock is leading edge defined, the corresponding synthetic PCI clock signal phase is appropriate.

Figure 10:
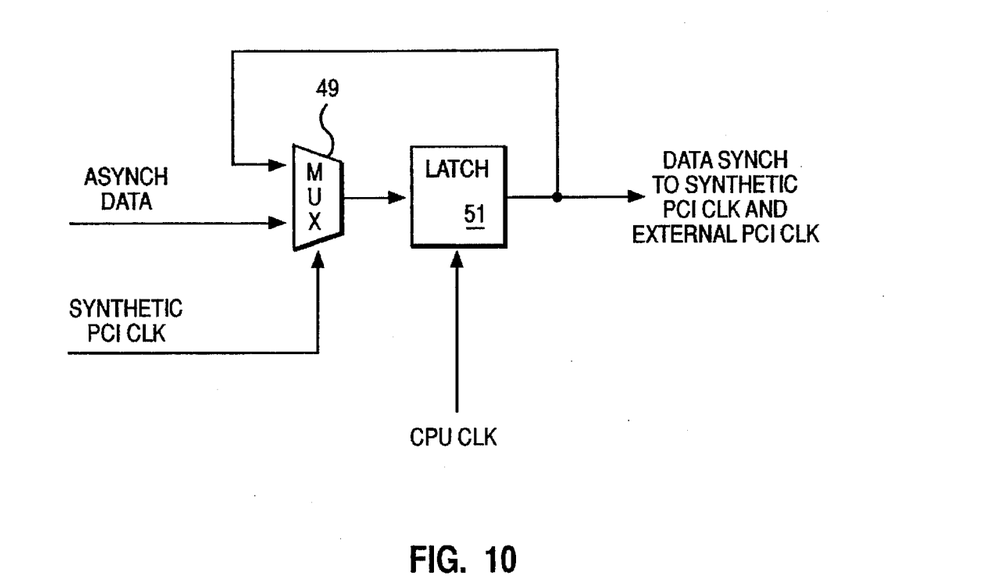
FIG. 10 schematically depicts synchronization circuitry of the form that would use with the synthetic clock signal in the bus bridge device of FIG. 1.

FIG. 10 schematically illustrates how the synthetic PCI clock signal and CPU clock signal are used to synchronize generally asynchronous data in the course providing the bus bridge device capability described with reference to FIG. 1. The combination of multiplexor 49, responsive to the synthetic PCI clock signal, and latch 51, responsive to the CPU clock signal, provide output data which is precisely synchronized to both clock signals.

Although the invention has been described and illustrated by way of specific embodiments, the apparatus and methods encompassed by the invention should be interpreted in keeping with the breadth of the claims set forth hereinafter.

We claim:

1. In a data processing system having multiple clock signals, where first and second clock signals may differ in frequency, apparatus for generating a synthetic clock signal, comprising:

means for determining a relative frequency between the second clock signal and the first clocking signal using the first clock signal;

means for selecting a frequency ratio for the synthetic clock signal based upon the relative frequency determined; and means for generating the synthetic clock signal, at the frequency of the second clock signal and in synchronism with the first clock signal, by relating the frequency ratio to the first clock signal.

2. The apparatus recited in claim 1, wherein the synthetic clock signal from the means for generating is fixed after initialization of the system.

3. The apparatus recited in claim 2, wherein the means for determining samples the second clock signal at the frequency of the first clock signal.

4. The apparatus recited in claim 3, wherein the sampling is accomplished in synchronism with the first clock signal as applied to a phase shifted version of the second clock signal.

5. The apparatus recited in claim 4, wherein the means for selecting decodes a binary pattern derived by the sampling.

6. The apparatus recited in claim 5, wherein the apparatus is internal to an integrated circuit chip, the clock signals originate external to the integrated circuit chip, and the edges of the second clock signal conform to a specification permitting material skew in relation to the edges of the first clock signal.

7. In a data processing system having multiple clock signals, wherein first and second clock signals may differ in frequency, a method for generating a synthetic clock signal, comprising the steps of:

determining a relative frequency between the second clock signal and the first clock signal using the first clock signal;

selecting a frequency ratio for the synthetic clock signal based upon the relative frequency determined; and generating the synthetic clock signal, at the frequency of the second clock signal and in synchronism with the first clock signal, by relating the frequency ratio to the first clock signal.

8. The method recited in claim 7, wherein the generated synthetic clock signal is fixed after initialization of the system.

9. The method recited in claim 8, wherein the step of determining samples the second clock signal at the frequency at the first clock signal.

10. The method recited in claim 9, wherein the sampling is accomplished in synchronism with the first clock signal as applied to a phase shifted version of the second clock signal.

11. The method recited in claim 10, wherein the step of selecting decodes a binary pattern derived by the sampling.

12. The method recited in claim 11, wherein the method is performed internal to and integrated circuit chip, the clock signals originate external to the integrated circuit chip, and the edges of the second clock signal conform to a specification permitting material skew in relation to the edges of the first clock signal.

13. In a data processing system having a high frequency processor clock signal and a low frequency input/output (I/O) clock signal, a circuit for generating a synthetic I/O clock signal, comprising:

means for sampling the I/O clock signal in synchronism with the processor clock signal;

means for selecting a frequency ratio for the synthetic I/O clock signal based upon a decode of the sampled I/O clock signal; and means for generating the synthetic I/O clock signal at the frequency of the I/O signal and in synchronism with the processor clock signal, by relating the frequency ratio to the processor clock signal.

14. The circuit recited in claim 13, wherein the synthetic I/O clock signal from the means for generating is fixed after initialization of the system.

15. The circuit recited in claim 14, wherein the means for sampling samples a phase shifted version of the I/O clock signal.

16. The circuit recited in claim 15, wherein the circuit is integral to an integrated circuit chip, the clock signals originate external to the integrated circuit chip, and the edges of the I/O clock signal conform to a specification permitting material skew in relation to the edges of the processor clock signal.

* * * * *